United States Patent [19]

Scott

[11] 4,347,868

[45] Sep. 7, 1982

[54] RELATING TO DEVICES FOR THE CLOSURE OF FLUID FLOW LINES

[75] Inventor: Michael J. Scott, Feilding, New Zealand

[73] Assignee: Allflex International Limited, Palmerston North, New Zealand

[21] Appl. No.: 206,515

[22] Filed: Nov. 13, 1980

[30] Foreign Application Priority Data

Nov. 14, 1979 [NZ] New Zealand .................. 192114
Jun. 11, 1980 [NZ] New Zealand .................. 194014

[51] Int. Cl.³ ............................................. F16K 17/00
[52] U.S. Cl. .................................. 137/462; 119/14.08; 251/57
[58] Field of Search ............... 119/14.08, 14.43, 14.44, 119/14.46; 251/29, 57; 137/462

[56] References Cited

U.S. PATENT DOCUMENTS

| | | | |
|---|---|---|---|
| 976,305 | 11/1910 | Sharples | 119/14.08 |
| 2,346,223 | 4/1944 | Lyon | 137/462 |
| 2,614,530 | 10/1952 | Perkius | 119/14.08 |
| 3,117,761 | 1/1964 | Billeter | 251/57 |
| 3,192,900 | 7/1965 | Lippke | 119/14.08 |
| 4,177,760 | 12/1979 | Slater | 119/14.08 |
| 4,253,421 | 3/1981 | Slater | 119/14.08 |

*Primary Examiner*—Harold W. Weakley

[57] ABSTRACT

A device for closing a fluid flow passage in response to a decrease in vacuum pressure existing in the passage. The device comprises a fluid flow passage with a seating therein. A diaphragm is located so that one face thereof can locate on the seating to close the passage. A chamber is formed partially by the or at least part of the other face of the diaphragm. In use the diaphragm is maintained away from said seating by a higher pressure in the chamber due to a pressure differential existing between chamber and passage. Venting means open the chamber to atmosphere, and means are provided to seal said venting means. Actuating means are provided and engage with said diaphragm when the pressure differential exists. Accordingly when the pressure differential is altered by a decrease in the vacuum in said passage, the resultant movement of the diaphragm causes the actuating means to operate the sealing means such that the venting means vent said chamber and enables the diaphragm to locate on the seat.

14 Claims, 5 Drawing Figures

RELATING TO DEVICES FOR THE CLOSURE OF FLUID FLOW LINES

This invention relates to a device for closing a fluid flow passage in response to a decrease in vacuum pressure existing in the passage.

A not uncommon occurrence during machine milking of animals is for the teat cups to either slip or fall off prior to completion of the milking operation. If the cups slip right off on to the floor of the milking shed, contaminants can enter through the cups and into the long milk tube. Also the cups slipping or falling off can, in certain types of milking machinery, have an adverse affect on one or more of the other sets of teat cups of the milking machinery. Accordingly, it is desirable to have some means of isolating the teat cup claw from the vacuum source when either the teat cups fall off the cow, one or more teat cups slip, or for any other reason there is an excessive vacuum drop in the long milk tube.

The object of the present invention is therefore to provide a device which can be incorporated in a fluid flow passage in which a vacuum exists, whereby the device closes the flow passage in response to a decrease in the vacuum therein.

Broadly in one aspect, the invention provides a device for closing a fluid flow passage in response to a decrease in vacuum pressure existing in the passage, said device comprising a fluid flow passage, a seating in the passage, a diaphragm located so that one face thereof can locate on said seating to close said passage, a chamber which is partially formed by the or at least part of the other face of said diaphragm, said diaphragm in use, being maintained away from said seating by a higher pressure in said chamber due to a pressure differential between said chamber and passage, venting means to open said chamber to atmosphere, and means to seal said venting means, said sealing means having actuating means which engages with said diaphragm when said pressure differential exists such that when the pressure differential is altered by a decrease in the vacuum in said passage, the resultant movement of said diaphragm causes the actuating means to operate the sealing means such that the venting means vent said chamber such that said diaphragm can locate on said seat.

In a preferred form the venting means comprises a port which is coupled by a conduit to a switching device whereby the port can be closed when required. The sealing means can be a moveable element (such as a piston) which is located the moveable element housing which is in communication with said chamber, the moveable element being slidably mounted such that in one position it closes said venting port. In such an arrangement the venting port is preferably located in said housing.

When the sealing means is formed by a piston the actuating means is conveniently a projection which extends from said piston and into said chamber to engage with the diaphragm when said pressure differential exists. The piston is preferably spring biassed to normally take up a position where said venting port opens the chamber to atmosphere.

The device according to this invention can be used in any fluid flow line in which a vacuum exists where it is desired that the line should be closed when an excessive vacuum drop occurs in the line. The device can in its simplest embodiment be formed by a body which incorporates a fluid flow passage, having an inlet and an outlet adapted to be coupled into an existing fluid flow line. In a milking machinery arrangement for example, the body could be simply inserted in a convenient position in the long milk tube. As an alternative, however, the device can be incorporated in part of the milking machinery equipment.

The venting port is in one form coupled by a conduit to a switching device so that in the preferred form the switching device is located at the milking claw, thus allowing the device to be located remote from the claw.

The device can be readily incorporated in the valve unit of the fluid flow sensing device which is described and claimed in commonly assigned U.S. Pat. Nos. 4,177,760 and 4,253,421. Accordingly, for convenience and ease of description the following preferred embodiment of the device will be described as forming part of the valve unit of the fluid flow sensing device described in U.S. Pat. No. 4,253,421. It should, however, be remembered that this is only by way of example and the invention is not limited to the device when incorporated in the valve unit of such a form of fluid flow sensing device.

In the following description of a preferred form of the invention, reference will be made to the accompanying drawings in which:

FIG. 1 is a cross sectional elevation of the device according to the invention and shown with a part of the valve unit disclosed in our U.S. Pat. No. 4,253,421, the device being shown in the position where normal milking is taking place;

Figure 1:
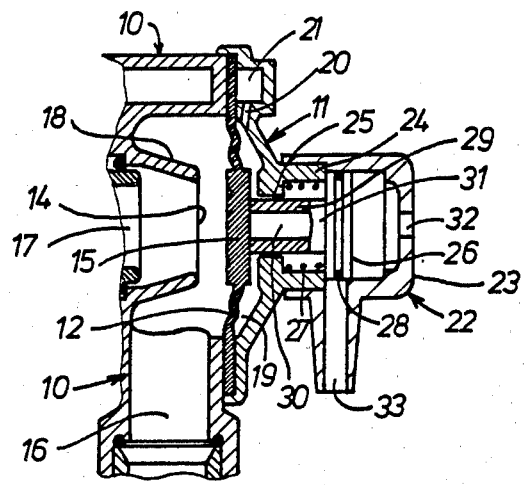

The operation and construction of the valve unit and liquid flow sensing device is set forth in our U.S. Pat. No. 4,253,421 (which is herein incorporated by way of reference), and therefore the drawings of the present specification show in cross section only a part of the valve unit of that device. Referring to FIG. 1, there is shown the stationary section 10 of the valve of the fluid flow sensing device and mounted thereon is a cover 11 with a diaphragm 12 being located in place on section 10 by cover 11. A central thickened portion 15 of diaphragm 12 is located opposite a seating 14 which is formed as part of section 10. Valve section 10 has an inlet 16 and an outlet 17 is formed by a tubular portion which is located, as described in U.S. Pat. No. 4,253,421 within the mouth portion 18 which forms a seating 14 at its end.

A chamber 19 is formed by cover 11 and diaphragm 12. As described in U.S. Pat. No. 4,253,421, chamber 19 is coupled via passageway 20 into a port 21 which is coupled to a vacuum source (not shown). In the normal milking position as shown in FIG. 1, thickened portion 15 of diaphragm 12 is located away from seating 14 due to a pressure differential which exists in the passage between inlet 16 and outlet 17 due to the vacuum pressure in chamber 19 being greater than that which exists in the fluid flow passage coupling inlet 16 and outlet 17.

A housing 22 is located on cover 11 and, in the form illustrated, comprises a cap 23 engaged on an annular wall 24 which is part of cover 11 and is concentric with an opening 25 in the cover 11. The internal diameter of wall 24 is less than the internal diameter of cap 23, thus providing a shoulder on which piston 26 can sealingly locate in the manner shown in FIG. 1. A compression spring 27 is located between the flat portion of cover 11 which surrounds opening 25 and piston 26. Piston 26 has a suitable seal such as for example a sealing ring 28 located in a peripheral groove.

Piston 26 is provided with a projection 29 which extends through opening 25 so as to be engageable at its free end with the thickened portion 15 of diaphragm 12. Projection 29 has an internal longitudinally extending bore 30 which communicates with a cross bore 31 at or adjacent the join of the projection with piston 26.

Cap 23 is provided at its top portion with an air bleed opening 32 so that the inside volume of the cap between the piston 26 and the top of the cap is always open to atmosphere. Cap 23 also includes a port 33 which forms the venting port for chamber 19.

FIG. 1 shows the device in the milking position where a pressure differential exists between the fluid flow passage and chamber 19 so that diaphragm 12 is maintained away from seating 14. In this position, the diaphragm engages with the free end of projection 29 and port 33 is isolated from chamber 19, due to the sealing effect of piston 26 on the shoulder surrounding opening 25. Piston 26 is maintained in position on the aforesaid shoulder against the bias of spring 27 due to the vacuum existing in chamber 19.

When the pressure differential between the fluid flow passage and chamber 19 exceeds a critical point, such as when there is an excessive vacuum drop in the fluid flow passage, the higher vacuum in chamber 19 draws diaphragm 12 further away from seat 14 with the result that piston 26 is moved in housing 22 such that chamber 19 begins to vent through port 33 via bores 30 and 31. The position of the moving elements of the device when the excessive vacuum drop occurs is shown in FIG. 2.

Figures 2, 3:
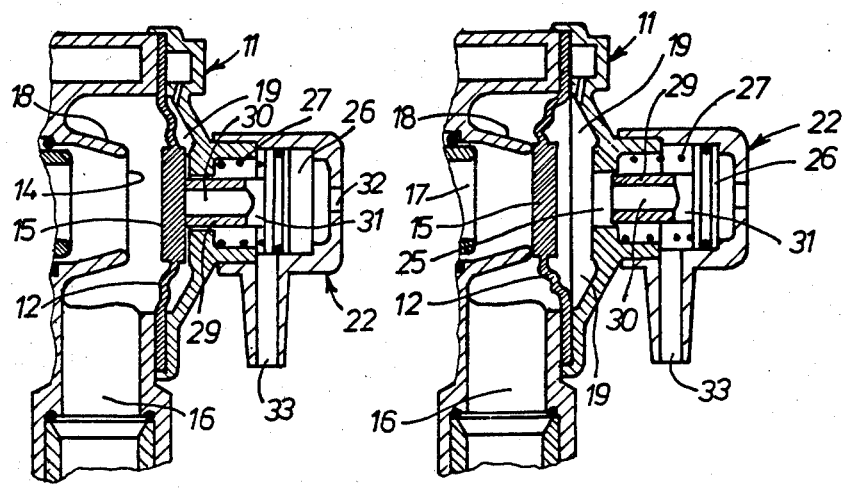
FIG. 2 is a similar cross-sectional view but showing the device when an excessive vacuum drop occurs in the fluid flow passage.
FIG. 3 is yet a further view, but showing the device in the position it takes up immediately following the occurance of the vacuum drop.

Referring now to FIG. 3, there is shown the disposition of piston 26 and diaphragm 12 after the vacuum drop has occurred and the fluid flow passage is closed. As piston 26 moves from the position shown in FIG. 1 to the position shown in FIG. 3, chamber 19 is venting to atmosphere through bores 30 and 31 with the result that the vacuum pressure in the fluid flow passage causes diaphragm 12 to be sucked onto seating 14 and so close the fluid flow passage.

Once the teat cups are repositioned on the animal being milked, port 33 is closed so that chamber 19 is evacuated with the result that piston 26 is drawn back to the position shown in FIG. 1 and diaphragm 12 is sucked off seat 14 to reopen the fluid flow passage. In its simplest form port 33 can be closed by the operator merely placing his or her finger over the port until such time as the milking position as shown in FIG. 1 is attained. In a preferred form, however, port 33 is coupled by a conduit to a remote normally open biassed switch which is located near the teat cup claw for the convenience of the operator. The operator thus closes the switch until the milking position is taken up and release of the switch enables it to return to its normal open position. The switch preferably has a lock closed provision to override automatic shut off during cleaning of the milking machinery.

Figure 4:
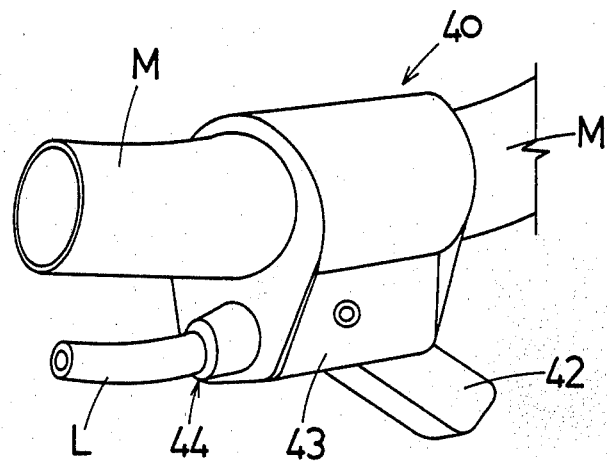
FIG. 4 is a perspective view of a switching device for closing the port of the device.
Figure 5:
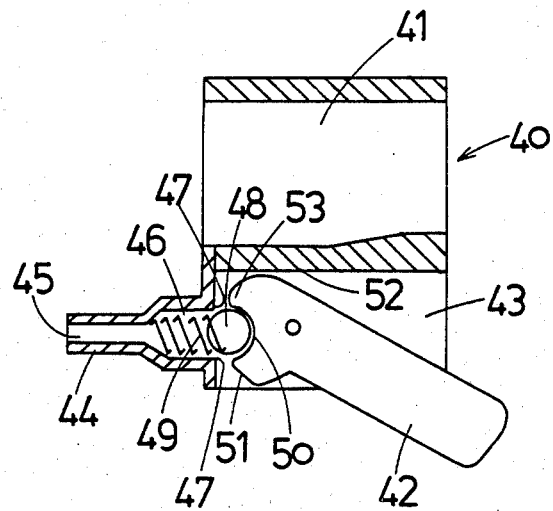
FIG. 5 is a cross-sectional elevation of the switching device.

An example of such a switch is illustrated in FIGS. 4 and 5 of the drawings. The switch has a moulded body 40 which has a bore 41 through which the milk line M can pass. A lever 42 is pivoted at one end to a bifurcated portion 43 of the body 40 and has a bore 45 which communicates with a chamber 46.

A conduit L is engaged at one end on nipple 44 whilst the other end is engaged on port 33.

Chamber 46 has an opening with a seat 47 on which a ball 48 can engage to close the opening. A spring 49 located within chamber 46 normally urges ball 48 away from the seat 47 to locate in a recessed surface portion 50 of lever 42. By the combined force of the ball 48 in recess 50 and the forward end 51 of lever 42 engaging against wall 52 of the bifurcated portion 43 the lever 42 remains in the position shown in FIG. 5.

To close port 33 as hereinbefore described, the operator moves lever 42 toward body 40 so that the raised portion 53 adjacent recess 50 pushes ball 48 onto seat 47 thus closing chamber 46. Once the milking position is taken up the lever can be released back to its illustrated position.

For cleaning, lever 42 is pushed away from body 40 so that forward end 51 engages with ball 48 to push it onto seat 47. The shape of the forward end 51 in combination with raised portion 53 engaging with wall 52 is such that the lever locks in position until released by the operator.

The device provided by the invention is simple in operation and effectively closes a fluid flow passage once there is an excessive drop of vacuum pressure in the fluid flow passage. The device can readily be incorporated as an integral part of the valve unit of the fluid flow sensing device disclosed in our U.S. Pat. No. 4,253,421, but can also form a separate unit which can be incorporated in any fluid flow line in which vacuum pressure exists.

What is claimed is:

1. A device for closing a fluid flow passage in response to a decrease in vacuum pressure existing in the passage, said device comprising a fluid flow passage, a seating in the passage, a diaphragm located so that one face thereof can locate on said seating to close said passage, a chamber which is partially formed by the or at least part of the other face of said diaphragm, said diaphragm in use, being maintained away from said seating by a higher pressure in said chamber due to a pressure differential between said chamber and passage, venting means to open said chamber to atmosphere, means to seal said venting means, and actuating means which engages with said diaphragm when said pressure differential exists such that when the pressure differential is altered by a decrease in the vacuum in said passage, the resultant movement of said diaphragm causes the actuating means to operate the sealing means such that the venting means vent said chamber such that said diaphragm can locate on said seat.

2. The device according to claim 1 wherein the sealing means is located within a housing which is in communication with said chamber, the sealing means being formed by a movable element which can move from a first position where the venting means open said chamber to atmosphere and a second position where said venting means is sealed.

3. The device according to claim 2 wherein the actuating means is a member located between said movable element and said diaphragm, said member having a passageway which opens at one end into said chamber and at its other end into said housing.

4. The device according to claim 3 wherein said movable element is a piston slidingly located within said housing, said actuating means being a projection extending from said piston and slidingly located within an opening in a wall between said chamber and the interior of said housing.

5. The device according to claim 4 wherein a seating is provided within said housing and on which said piston seats when in said second position, there being spring means to bias said piston away from said seating.

6. The device according to claim 5 wherein the spring means is a compression spring located between the wall having said opening and said piston.

7. The device according to claim 5 or 6 wherein the passageway in said projection is formed by a through bore with a cross-bore located adjacent the piston.

8. The device according to claim 5 or 6 wherein the venting means includes a port located in said housing and opens into said housing adjacent said seating for the piston such that the venting port is isolated from the interior of said housing between said piston and said wall when said piston is in said second position.

9. The device according to claim 8 wherein the housing includes a second port open to atmosphere, said second port being located to the side of said piston opposite that from which the projection extends.

10. The device according to claim 1 or 2 wherein said venting port is coupled to a switching device whereby a venting port of the venting means can be externally closed.

11. The device according to claim 10 wherein the switching device includes a chamber coupled by a conduit to said venting port, said chamber being open to atmosphere, and means to close said chamber.

12. The device according to claim 11 wherein the closure means is formed by a closure element to close a vent opening into said chamber, the closure element being biassed to be normally clear of said vent opening but movable to close the vent opening by lever means.

13. The device according to claim 12 wherein the closure element is a spring biassed ball and said lever means includes means for locating said ball, the lever means being movable to urge the ball against the spring bias into a position to close said vent opening.

14. The device according to claim 13 wherein said lever means includes second ball locating means which also urges said ball over said vent opening when said lever means is moved into a locked position.

* * * * *